(12) United States Patent
Rawcliffe et al.

(10) Patent No.: US 6,834,591 B2
(45) Date of Patent: Dec. 28, 2004

(54) PROXIMITY FUZE

(75) Inventors: John G. Rawcliffe, Bury (GB); David E. Patrick, Letchworth (GB); John Anderson, Letchworth (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/084,651

(22) Filed: Feb. 28, 2002

(65) Prior Publication Data

US 2002/0144619 A1 Oct. 10, 2002

Related U.S. Application Data

(63) Continuation-in-part of application No. 09/465,752, filed on Dec. 17, 1999, now abandoned.

(30) Foreign Application Priority Data

Dec. 23, 1998 (GB) .............................................. 9828407

(51) Int. Cl.[7] .............................................. F42C 13/04
(52) U.S. Cl. .......................... 102/214; 102/215; 342/68
(58) Field of Search ................................ 102/214, 215, 102/221; 342/68

(56) References Cited

U.S. PATENT DOCUMENTS

| 2,537,593 | A | * | 1/1951 | Landon et al. ................. 342/87 |
| 2,928,085 | A | * | 3/1960 | Katz ............................ 342/87 |
| 3,229,286 | A | * | 1/1966 | Samuel et al. ................. 342/87 |
| 3,745,573 | A | * | 7/1973 | Dick ............................ 342/68 |
| 3,781,884 | A | * | 12/1973 | Horton ........................ 102/214 |
| 3,877,377 | A | * | 4/1975 | Rabinow ...................... 102/214 |
| 4,203,110 | A | * | 5/1980 | Dick ............................ 102/214 |
| 4,217,827 | A | * | 8/1980 | Dent ............................ 102/214 |
| 4,360,812 | A | * | 11/1982 | Peperone ...................... 102/214 |
| 4,660,040 | A | * | 4/1987 | Grandos |
| 5,251,548 | A | * | 10/1993 | Spence ........................ 102/221 |
| 6,020,854 | A | * | 2/2000 | Jagnow et al. |
| 6,098,547 | A | * | 8/2000 | West .......................... 102/214 |
| 6,129,022 | A | * | 10/2000 | Hickey et al. .............. 102/221 |
| 6,198,425 | B1 | * | 3/2001 | Nastronero ................. 102/214 |

FOREIGN PATENT DOCUMENTS

| DE | 19530065 | 1/1997 |
| DE | 19646228 | 5/1998 |
| DE | 19652994 | 6/1998 |
| JP | 8-114400 | 5/1996 |
| JP | 9-21600 | 1/1997 |

* cited by examiner

*Primary Examiner*—Michael J. Carone
*Assistant Examiner*—L. Semunegus
(74) *Attorney, Agent, or Firm*—Nixon & Vanderhye P.C.

(57) ABSTRACT

A proximity fuze for use in a tube launched projectile carrying a payload, comprising an oscillator for generating a radio frequency signal which has a varying frequency, a single antenna for transmitting the radio frequency signal and for receiving an echo of the radio frequency signal, a first signal processor for generating a range signal corresponding to the time delay between the transmission of the radio frequency signal and the receipt of the echo signal, second signal processor for comparing the range signal with a reference signal and depending on the result of the comparison generating an activation signal for activating the payload, wherein a directional coupler is used for coupling the radio frequency signal from the oscillator to the antenna and to the signal processor and for coupling the echo signal from the antenna to the signal processor, and wherein the second signal processor comprises a threshold detector, a peak detector and a comparator, the threshold detector being for allowing the comparator to utilise the output from the peak detector only once the range signal has reached a predetermined magnitude.

11 Claims, 7 Drawing Sheets

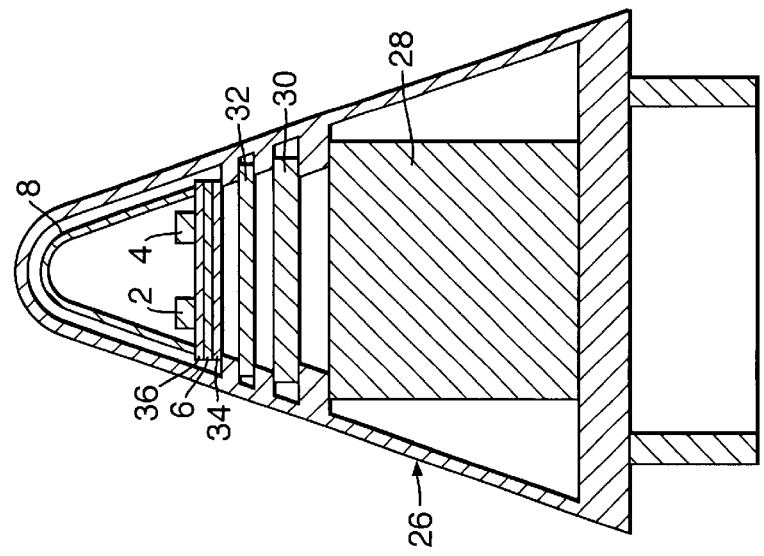
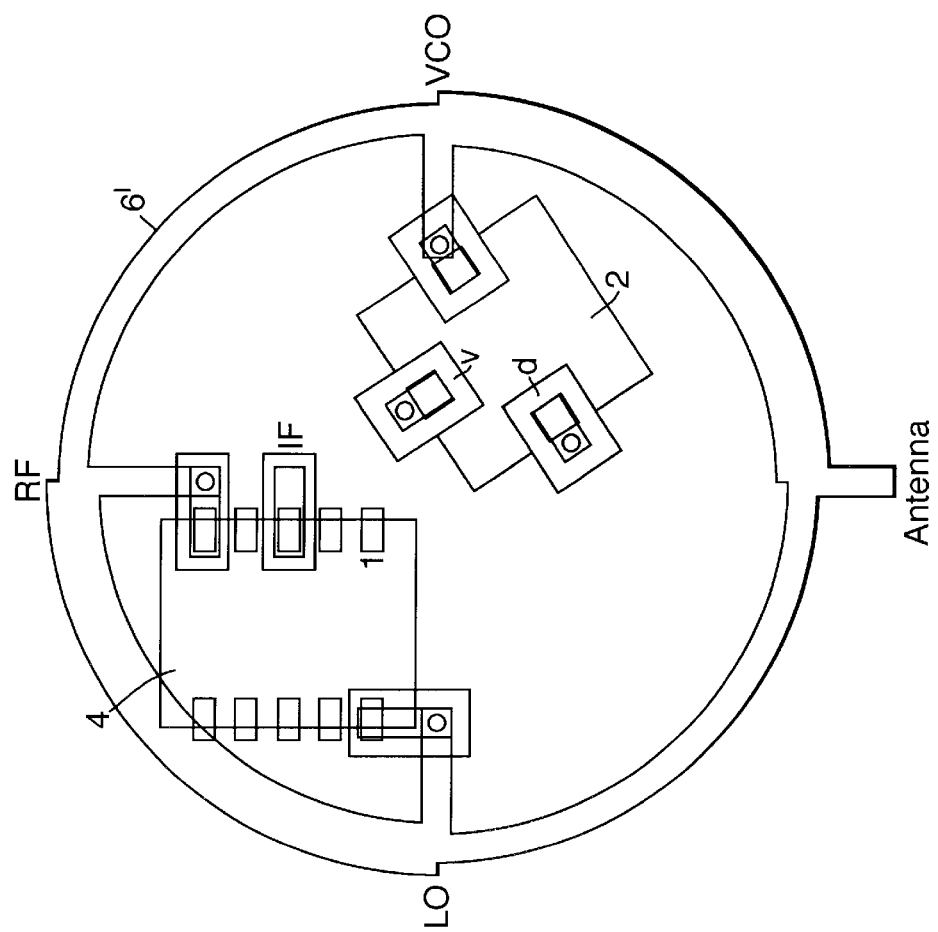

PROXIMITY FUZE

This application is a Continuation-in-Part of application Ser. No. 09/465,752 filed Dec. 17, 1999, which claims priority to GB Application No. 9828407.8 filed Dec. 23, 1998. The entire contents of these applications are incorporated herein by reference.

BACKGROUND OF THE INVENTION

1. Field of the Invention

The present invention relates to an improved proximity fuze for a tube launched projectile carrying a payload.

2. Discussion of the Prior Art

The use of a fuze on a payload carrying projectile has two main functions. Firstly, it protects a handler of the projectile from inadvertent detonation or activation of the payload from when the projectile is manufactured until it is at least several meters from the site from which is was launched. Secondly, it initiates detonation or activation of the payload at a range from a target or from the ground, which range is appropriate to the function of the payload. The appropriate range may be contact with the target, after contact with the target, time from launch or proximity to the target. It is the latter type of fuze, a proximity fuze, to which the present invention relates.

Current proximity fuzes use a sensing technique known as "doppler" proximity sensing. This technique requires a continuous constant wavelength radio frequency signal to be transmitted by the fuze such that when the projectile approaches its target, the fuze starts to receive its own transmitted signal reflected back from the target. This return or echo signal then interferes with the transmitted signal from the fuze in a sequence of constructive and destructive interference as the projectile gets closer to the target. For a particular reflectivity of target and given that the power of the radio signal transmitted by the fuze and the gain of the receiver which detects the return signal are set, the distance of the projectile from the target when the fuze first starts to detect its own returned transmitted signal can be predicted. Based on this prediction of the proximity of the projectile to the target when the return signal is first detected by the fuze, the fuze can be made to count through successive cycles of constructive interference. The number of cycles of constructive interference that the fuze counts before it activates the payload can thus be set to fix the proximity of the fuze to the target when the fuze activates the payload.

One problem with this type of fuze is that different targets will have different reflectivities and so the distance from the target at which the fuze first starts to receive a reflected signal will vary from target to target. Accordingly, the distance from the target at which the payload is activated, ie. after the predetermined number of cycles of constructive interference have been counted, will vary from target to target. This reduces the accuracy of such "doppler" type proximity fuzes. This lack of accuracy is generally overcome in the field by firing a first projectile and observing its proximity to the target when it is activated. Then the number of cycles of constructive interference which are counted before activation can be adjusted for subsequently fired projectiles directed at the same target. However, an increasing number of potential applications require a higher accuracy fuze without the need for adjustment prior to use.

A further reduction in accuracy is caused because the frequency of the radio signal transmitted by the fuze is not generally as stable as required and so the timing of successive cycles of constructive interference will not be accurate. Further inaccuracies can be added because the ability of the fuze to detect cycles of constructive interference is dependent on background noise levels. Finally, the simple algorithm used by these "doppler" type proximity fuzes and the continuous transmission at one frequency can make them relatively easy to detect and to cause the fuze to malfunction, either by accident, eg. if the ammunition travels through a radar beam or by active sensor jamming measures taken by the enemy.

The aim of the present invention is to provide an improved proximity fuze which can overcome at least some of the problems discussed above. In particular the present invention aims to provide a more accurate proximity fuze which is more difficult to defeat by active sensor jamming measures than the currently used "doppler" type fuzes.

SUMMARY OF THE INVENTION

According to a first aspect of the present invention there is provided a proximity fuze for use in a tube launched projectile carrying a payload, comprising:

oscillator means for generating a radio frequency signal which has a varying frequency, a single antenna means for transmitting the radio frequency signal and for receiving an echo of the radio frequency signal, first signal processing means for generating a range signal corresponding to the time delay between the transmission of the radio frequency signal and the receipt of the echo signal, second signal processing means for comparing the range signal with a reference signal and depending on the result of the comparison generating an activation signal for activating the payload, wherein a directional coupling means is used for coupling the radio frequency signal from the oscillator means to the antenna means and to the signal processing means and for coupling the echo signal from the antenna means to the signal processing means, and wherein the second signal processing means comprises a threshold detector, a peak detector and a comparator, the threshold detector being for allowing the comparator to utilise the output from the peak detector only once the range signal has reached a predetermined magnitude.

The transmitted signal is reflected by the target for the projectile or by the ground and the antenna means receives an echo signal, ie. the component of the transmitted radio frequency signal which is reflected off the ground or the target. As the transmitted radio frequency signal has a time varying property, this property of the received signal will be different from that of the transmitted signal by an amount dependant on the rate at which the property of the radio frequency signal varies and the time it takes for the radio frequency signal to travel between the antenna to the target or the ground and back. As the time it takes for the radio frequency signal to travel between the antenna to the target or the ground and back is directly related to the distance or proximity of the antenna (and thus the projectile) from the ground or the target, the difference between the relevant property of the transmitted and received signal can be used to generate a range signal indicative of the distance between the projectile and the ground or target. This range signal can then be compared with a reference signal having the value that the range signal will take when the projectile is in the correct proximity to be activated. When the range signal and the reference signal are the same an activation signal is generated to activate the payload of the projectile, which could be, for example, high explosives, obscurance material or a lighting flare.

The fuze according to the present invention does not rely on the attenuation in amplitude of the echo signal as compared to the transmitted signal as an indicator of the distance it has travelled to reach the target (or the ground) and to return. Therefore, the ranges calculated in the fuze according to the present invention are not dependent on the reflectivity of the target (or the ground). Provided the echo signal has an amplitude sufficient to be received by the antenna means then the comparison of the time varying property of the transmitted signal and the echo signal can be used to generate an accurate indication of the range of the projectile from the target (or the ground).

In a first preferred embodiment the amplitude of the echo signal does not alter the calculated range, and the radio frequency signal is transmitted continuously. This preferred embodiment is suitable for use at relatively close proximities, such as 0.5 m to 500 m.

The signal processing means of the fuze preferably comprises mixing means for mixing a part of the transmitted signal with a part of the echo signal to generate a range signal comprising an intermediate frequency signal with a frequency corresponding to the difference between the frequency of the transmitted radio frequency signal and the received echo signal.

The frequency of the transmitted signal and the echo signal are compared by mixing them in a mixing means to generate a intermediate frequency signal with a frequency equal to the difference between the frequency of the transmitted and the frequency of the received signal. The rate at which the frequency of the transmitted signal changes is known and so the difference in the frequency of the transmitted and received signal can be used to calculate the time taken for the transmitted signal to travel to the target (or the ground) and return to the antenna means and accordingly can be used to accurately calculate the distance of the projectile from the target (or the ground). To simplify the range calculation it is preferred that the oscillator generates a radio frequency signal for transmission by the antenna means which has a linearly varying frequency.

As the transmitted frequency changes and as the frequency of the received signal required to trigger activation of the payload of the projectile is not the same as the transmitted frequency and also changes, the fuze according to the present invention is more difficult to defeat using active sensor jamming measures than a "doppler" type fuze which transmits and receives a single frequency.

Preferably, the oscillator means comprises a voltage controlled oscillator and preferably the fuze additionally comprises means for generating a linear triangular waveform voltage for driving the voltage controlled oscillator.

In order to reduce the complexity and cost of the fuze a single antenna means is used for transmitting the radio frequency signal and for receiving the echo signal. This allows a directional coupling means to be used for coupling the radio frequency signal from the oscillator means to the antenna means and to the signal processing means and for coupling the echo signal from the antenna means to the signal processing means. A preferred directional coupling means which provides low cost and small size is a quarter wavelength branchline coupler comprising four ports. If such a coupler is used, to save space the oscillator means and the mixing means can be located within an area bordered by the quarter wavelength transmission lines of the branchline coupler.

According to an alternative embodiment of the present invention which is suitable for use at longer ranges, such as 500 m to 1 km the fuze is adapted to allow operation in a pulsed mode for transmitting a pulsed radio frequency signal. Here the time varying property can be amplitude as the amplitude of the radio frequency signal varies between zero and the amplitude with which the pulses are transmitted. According to this embodiment a series of pluses of radio frequency signal are transmitted, for example 10 pulses, and the echo signal pulses are received after travelling to the target (or the ground) and back. The time delay between transmitting the pulses and receiving them can be used to determine the range of the projectile from the target (or the ground). Furthermore, the difference in time delay for successive pulses can be used to determine the relative velocity between the target (or the ground) and the projectile. This embodiment is suitable for use at longer ranges because at short ranges the time delay between transmitted and received signals is too short for transmitted and received pulses to be discriminated, that is an echo of a pulse will be received while that pulse is still being transmitted.

This pulsed mode of operation can be used in combination with the frequency varying mode of operation described above. At long range the fuze can initially operate in pulsed mode to determine its proximity to the target (or the ground) and its velocity relative to the target (or the ground) and depending on the calculated distance and velocity can shut down until it is closer to the target (or the ground). Then, at a predetermined shorter range the fuze can be operated in frequency varying mode to calculate its range from the target (or the ground) and activate the payload of the projectile when the calculated range is the desired value for activation of the payload.

The second signal processing means further includes two filters of differing time constants, the outputs of both filters being connected to the input of the threshold detector.

According to a second aspect of the present invention there is provided a tube launched projectile comprising a fuze as defined above.

BRIEF DESCRIPTION OF THE DRAWINGS

The present invention will now be described with reference to the following figures in which:

FIG. 7 shows schematically the preferred circuit layout of the transceiver shown in FIG. 6;

FIG. 8 shows schematically the location of the proximity fuze according to the present invention incorporating the transceiver of FIG. 7 in the nose of a tube launched projectile;

DETAILED DESCRIPTION OF THE INVENTION

Figure 1:
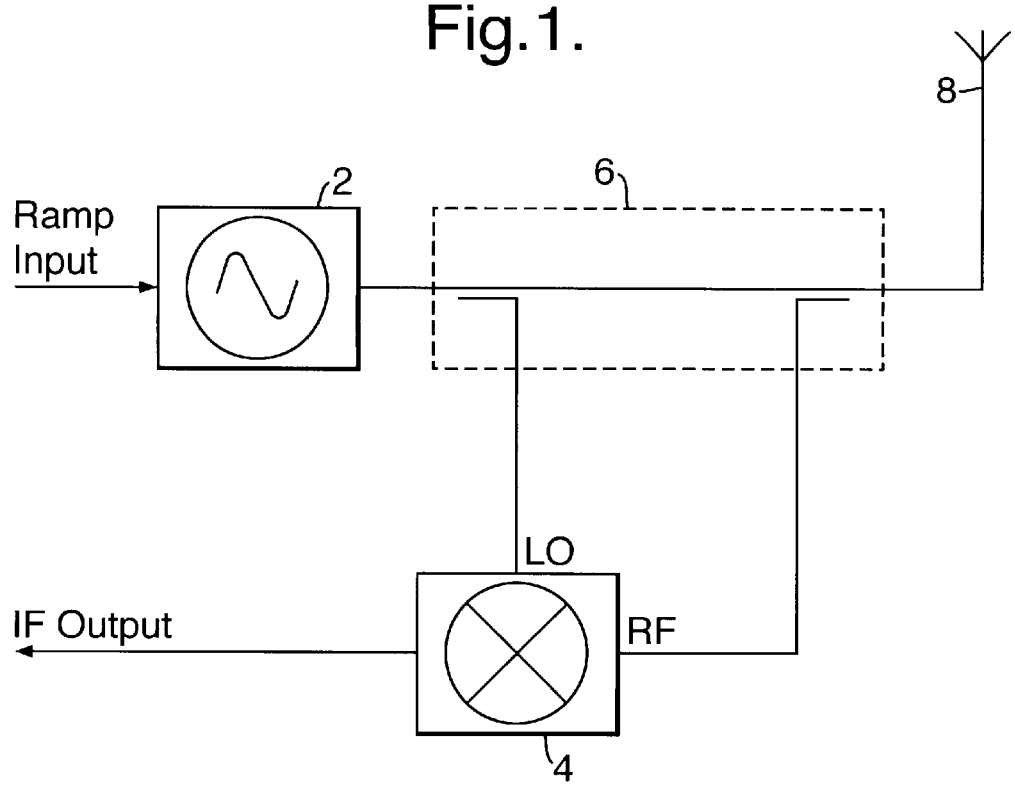
FIG. 1 shows schematically a transceiver of the proximity fuze according to the present invention.

In FIG. 1 is shown a transceiver according to the present invention which comprises a voltage controlled oscillator (2), a mixer (4), a directional coupler (6) and an antenna (8). The voltage controlled oscillator (2) is controlled by a continuous linear triangular voltage waveform. The oscillator (2) converts the input voltage waveform into a radio frequency signal having a linear frequency sweep (a chirp). The oscillator output signal is divided into two parts by the coupler (6). Part of the signal is directly coupled to and transmitted by the antenna (8) and the other part of the signal is coupled to the local oscillator (LO) port of the mixer (4). The radio frequency signal is radiated by the antenna (8) in a semi-omnidirectional manner and a small part of the radiated power is reflected back to the antenna (8) by a target or by the ground. This returned or echo signal is divided into two parts, one part is coupled to the radio frequency (RF) port of the mixer (4) and the other part is coupled to and terminated in the oscillator (2).

Figure 2:
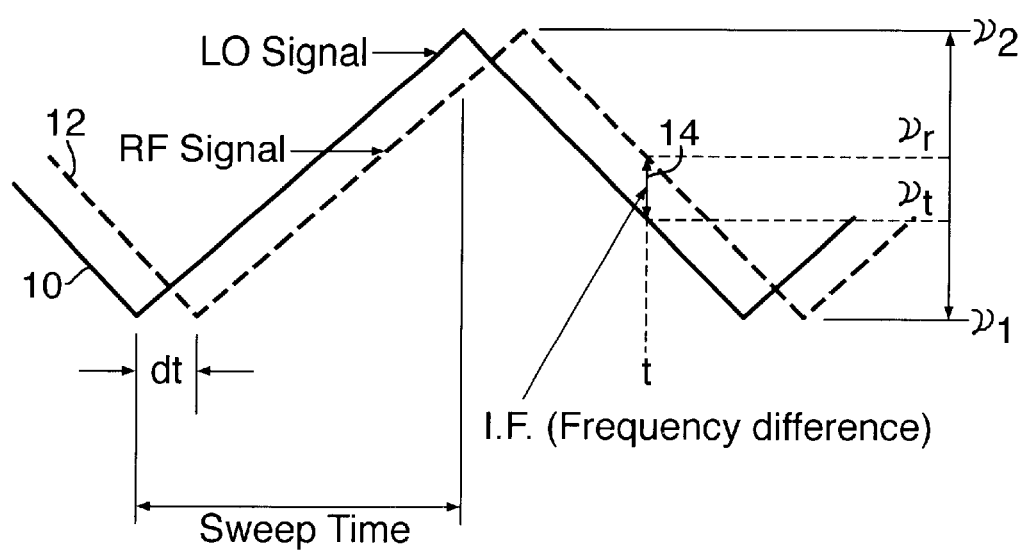
FIG. 2 is a graph of frequency against time showing the radio frequency signal transmitted and the echo signal received by the transceiver of FIG. 1.

FIG. 2 shows a schematic representation of the frequency change with time of the radio frequency signals transmitted and received by the antenna (8), ie. the frequency change of the signals at the LO and RF ports of the mixer (4) respectively. The transmitted signal travels from the antenna (8) to the ground and back at the speed of light which takes a finite and measurable time (δt in FIG. 2). The time taken (δt) corresponds to the intermediate frequency (IF) output from the mixer (4). As indicated above, the voltage controlled oscillator (2) is controlled by a continuous linear triangular voltage waveform. This generates a radio frequency output from the oscillator (2) which undergoes a linear frequency sweep (or chirp) between $f_1$ and $f_2$ as shown in the full line (10) of FIG. 2. The input into the LO port of the mixer (4) (full line (10) in FIG. 2) is representative of the frequency transmitted by the antenna (8) and the input into the RF port of the mixer (4) (dotted line (12) in FIG. 2) is representative of the frequency received by the antenna (8). The mixer (4) then generates an IF output (represented by difference (14) in FIG. 2) which is representative of the difference between the frequency of the LO and RF port inputs. Because the frequency transmitted by the antenna (8) is either linearly increasing or linearly decreasing the difference between the frequency transmitted by the antenna $f_t$ and the frequency received by the antenna $f_r$ at any time t (See FIG. 2) is directly and linearly related to the time δt it has taken for the transmitted signal to reach the target or the ground and be reflected back to the antenna, ie. it is directly and linearly related to the distance of the antenna, and thus of a projectile carrying the antenna, above the ground.

The frequency of the IF output from the mixer is directly proportional to the product of the frequency sweep rate (Hz/s) (the rate at which the frequency of the transmitted signal changes with time) and the round trip time (the time it takes for the transmitted signal to travel from the antenna to the ground or target and back to the antenna). The round trip time is equal to twice the range of the antenna (the range is the distance of the antenna from the ground or target) divided by the speed of light. When the intermediate frequency output from the mixer (4) is known then:

$$R = cSf/2d$$

where
R=Range (m)
c=Speed of light (ms$^{-1}$)
S=Sweep time (s), ie. the time to sweep from $f_1$ to $f_2$ or vice versa
f=Intermediate frequency (Hz)
d=Chirp deviation Thus, if the projectile is to be set to activate its payload at a range R, the reference signal with which the intermediate signal from the mixer (4) is compared is the corresponding value for f.

As the projectile gets closer to the target or the ground the time taken for the echo signal to be received (δt in FIG. 2) decreases and so the traces in FIG. 2 of the frequency of the transmitted signal (black lines) and echo signal (dotted lines) will move closer together. Thus, as the projectile approaches the target or the ground the frequency of the intermediate frequency signal generated by the mixer (4) will become smaller. When the intermediate frequency is equal to a reference frequency f as calculated above which corresponds to the range R at which the payload is to be activated, signal processing means responsive to the intermediate frequency signal generates an activation signal that activates the payload.

The transceiver according to the present invention avoids the problem of variable ground reflectivity because it compares the frequency of the transmitted and reflected signals and is not dependent on the amplitude of the reflected signal to determine range. The present system is only dependent on the amplitude of the echo signal to the extent that there has to be a detectable echo signal for the system to work, however, this is a matter of designing the system to cope with the worst case conditions.

Figure 3:
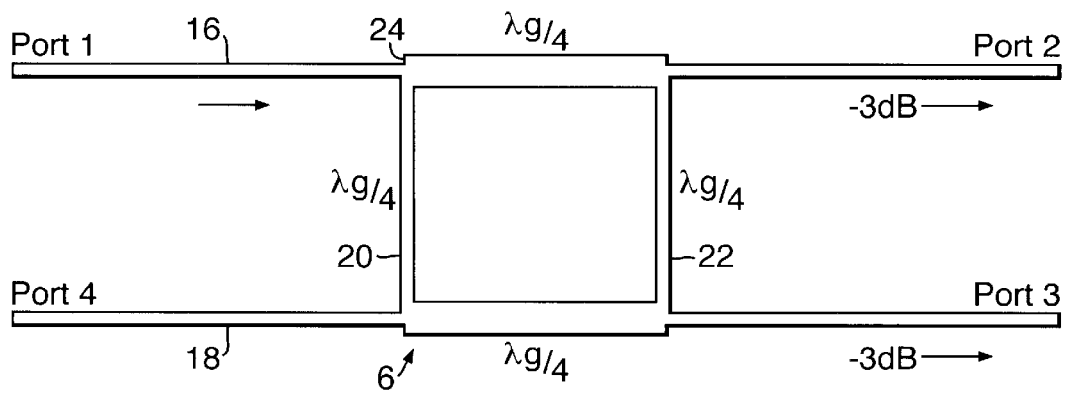
FIG. 3 shows schematically a directional branchline coupler for use in the transceiver of FIG. 1.

A branch line coupler (6) as shown in FIG. 3 is used in the arrangement of FIG. 1, because it is directional, has four ports and provides at least a 3 dB power split. Also, it is relatively insensitive to other components in close proximity and only takes up a small amount of space (preferably a diameter of less than 30 mm) as it will have to be located with other components in a small space in the projectile. The coupler (6) operates at a frequency of 2.45 GHz with a return loss and isolation of at least −15 dB over a range of 100 MHz.

Figure 4:
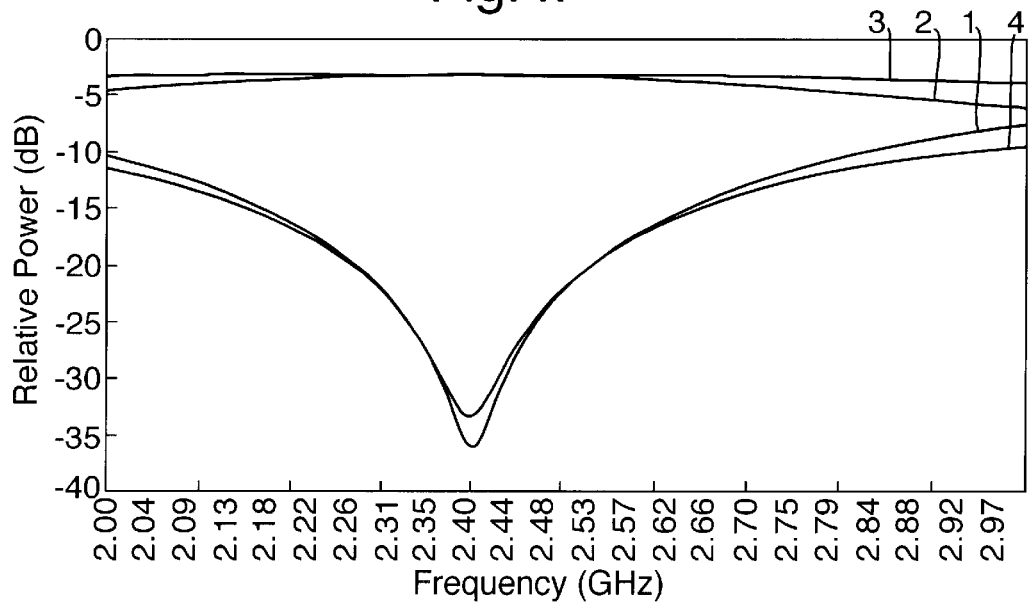
FIG. 4 is a graph of relative power against frequency showing the output of the ports 1 to 4 of the coupler of FIG. 3 when a signal is input into port 1.

The branch line coupler (6) consists of two parallel transmission lines (16) and (18) cross-connected by two quarter wavelength branch lines (20) and (22) which are spaced apart by a quarter wavelength. These transmission and branch lines of the coupler (6) are sandwiched between two pieces of groundplane substrate (34 and 36 in FIG. 8) to form a stripline structure, in the conventional way. Power into any one of the four ports of the coupler (6) will be split into two and appear in phase quadrature at the opposing two ports and the adjacent port will receive no output when the coupler (6) is correctly terminated. For example, a signal input into Port 1 of the coupler (6) will be split in two at junction (24) and appear at Port 2 and Port 3 with a relative delay at Port 3 of $\lambda_g/4$ relative to the output from Port 2 and no output will be received at Port 4. The input impedance of the coupler (6) was selected to be 50 Ohms and its modelled output is shown in FIG. 4 which shows the variation in the output powers of Ports 1 to 4 with the frequency of a signal which is input at Port 1. It can be seen that the 3 dB split required for the coupler (6) is achieved across an adequate bandwidth.

Figure 5:
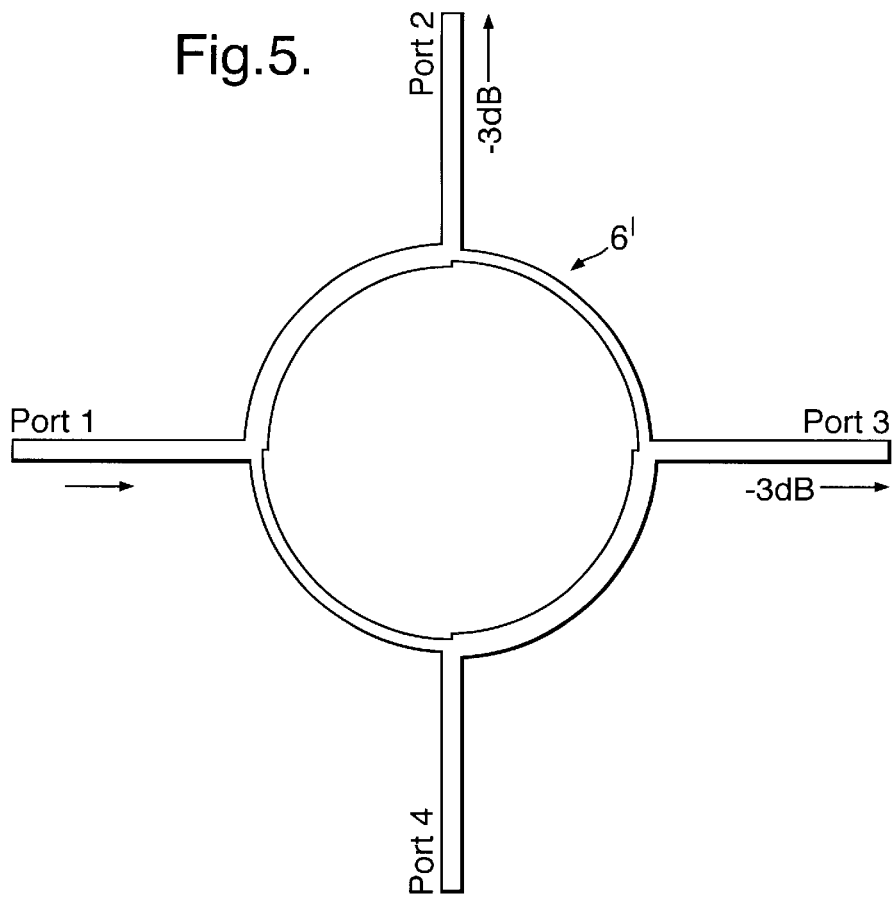
FIG. 5 shows an equivalent coupler to that shown in FIG. 3 in a ring formation.

As an alternative the coupler (6') shown in FIG. 5 could be used. The coupler (6') is equivalent to the coupler (6) shown in FIG. 3, except that it is formed into a ring as this gives a space saving.

Figure 6:
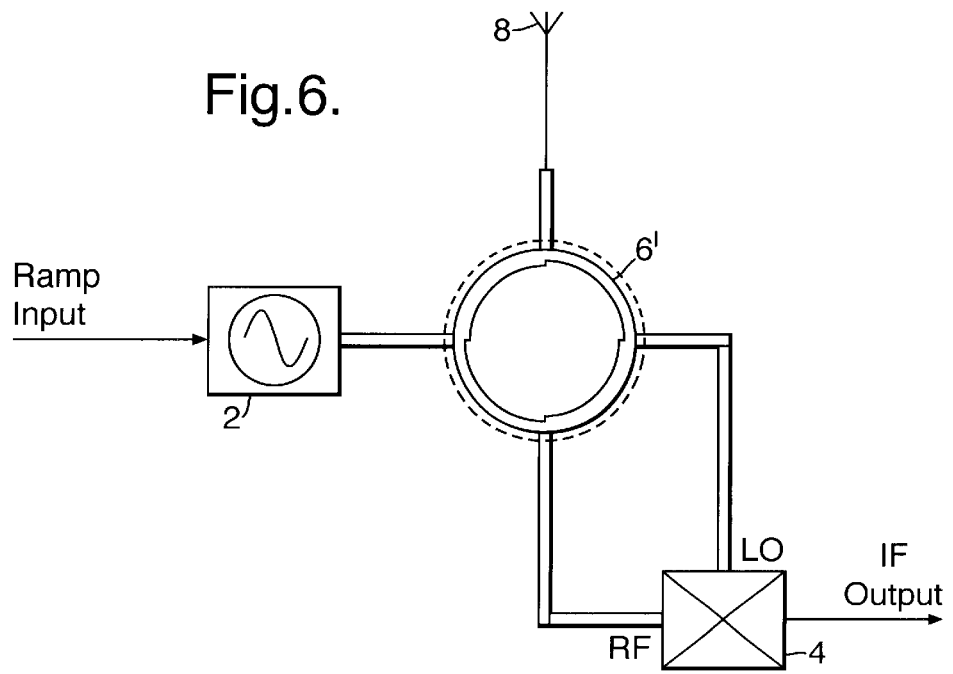
FIG. 6 shows schematically a transceiver similar to that in FIG. 1 but using the ring coupler of FIG. 5.

FIG. 6 shows a transceiver similar to that in FIG. 1 (with like parts having like numerals) which uses a ring coupler (6') as described above in relation to FIG. 5. The mixer (4) is a type CDB-9025 mixer available from ST OLECTRON CORP and the oscillator (2) is a type MV-146 available from MODCO. A suitable space for the oscillator (2) and mixer (4) was found inside the perimeter of the ring coupler (6') as is shown in the detailed layout in FIG. 7 (again with like numerals indicating like parts) in order to conserve space. The coupler (6') is sandwiched between two pieces of groundplane substrate (34 and 36), and the oscillator (2) and mixer (4) will sit on top of the one of these substrates (36) as shown schematically in FIG. 8.

FIG. 8 shows a proximity fuze which uses the transceiver arrangement of FIG. 7 located in the nose portion (26) of a projectile. The nose portion (26) can be fitted to the remainder of the projectile (not shown) containing a payload. The nose (26) houses a battery (28) for powering the fuze, control electronics (30), a receive electronics (32) and the transceiver arrangement of FIG. 7, including an antenna (8). The control electronics (30) generate the triangular voltage waveform used to drive the voltage controlled oscillator (2). The receive electronics receives the IF signal generated by the transceiver arrangement of FIG. 7 and compares it to a predetermined intermediate frequency value which corresponds to the distance from the ground at which the payload of the projectile is to be detonated or activated. When the IF frequency generated by the transceiver arrangement of FIG. 7 is equal to the predetermined intermediate frequency value the receive electronics generate an activate signal which is used to activate the payload of the ammunition. The predetermined intermediate frequency value will be set at different levels corresponding to different activation heights suitable for different applications.

It is also possible to make the intermediate frequency at which the activation signal is generated adjustable by an adjustment mechanism, using for example voltage tunable filters (not shown). However, a simpler way to change the range at which the fuze activates the payload is by changing the sweep time (S in the equation on page 11) of the frequency varying signal transmitted by the antenna and keeping the intermediate frequency at which the fuze activates the payload constant. For a fixed intermediate frequency f, the sweep time S will be proportional to the range at which the fuze activates the payload. So for longer ranges the sweep time can be increased and for shorter ranges the sweep time can be decreased.

The oscillator (2) and mixer (4) are mounted on one of the two groundplane substrates (34,36) which sandwich the ring coupler (6'). The antenna (8) provides at least hemi-spherical coverage in order to detect the ground reliably under all attitude and roll conditions of the ammunition in flight.

The frequency variation of the output of the oscillator (2) with drive voltage is such that the frequency tunes from about 2.4 GHz at 5V to 2.7 GHz at 10V. The region from 5V to 7V adequately covers the frequency band of interest and the tuning sensitivity within this region is about 90 MHz per volt. The linearity of the frequency output of the oscillator (2) in the range of 5V to 7V is around 20% peak to peak, which is adequate for the present application.

The proximity fuze described above is can be used for detonation ranges of between 3 to 15 m for high explosive and smoke rounds, at around 80 m for illumination flares and obscurance rounds and for cargo rounds.

For longer distances, in which the received signal is separated from the transmitted signal by a time period greater than twice the sweep time (ie. greater than a single period of the triangular waveform used to generate chirp), the fuze according to the present invention is preferably operated in a pulsed mode. In pulse mode the time taken for a pulse of rf signal to be transmitted from the antenna until the echo of it is received can be used to determine the distance of the projectile from the ground. The relative change in time delay for successive pulses can be used to determine the velocity of the projectile in the vertical direction, ie. relative to the ground. The pulse width could be as short as around 2 to 3 microseconds, which would work down to ranges of around 500 m. At closer ranges it would not be possible to discriminate between transmitted and received pulses. A series of for example, 10 pulses could be transmitted and received and then the transmission of signals could be switched off for a period dependent on the measured distance and velocity until the ammunition is closer to the ground. After a time delay dependent on the previously calculated range and velocity when the projectile is close enough to the ground, the transmission of a radio frequency signal would again be started and the fuze arrangement could be operated in intermediate frequency mode (ie. as described above in relation to FIGS. 1 to 8) to detonate the ammunition at the predetermined height above the target. Switching transmission off for a period would help counteract jamming.

The control electronics (30) shown in FIG. 8 can include timers to turn the proximity fuze on and off and to switch between the pulsed operating mode at longer ranges and the frequency varying operating mode at shorter ranges. In pulse mode the control electronics can be used to work out the range of the fuze from the target or the ground depending on the timing of the sending and receipt of successive pulses.

Figure 9:
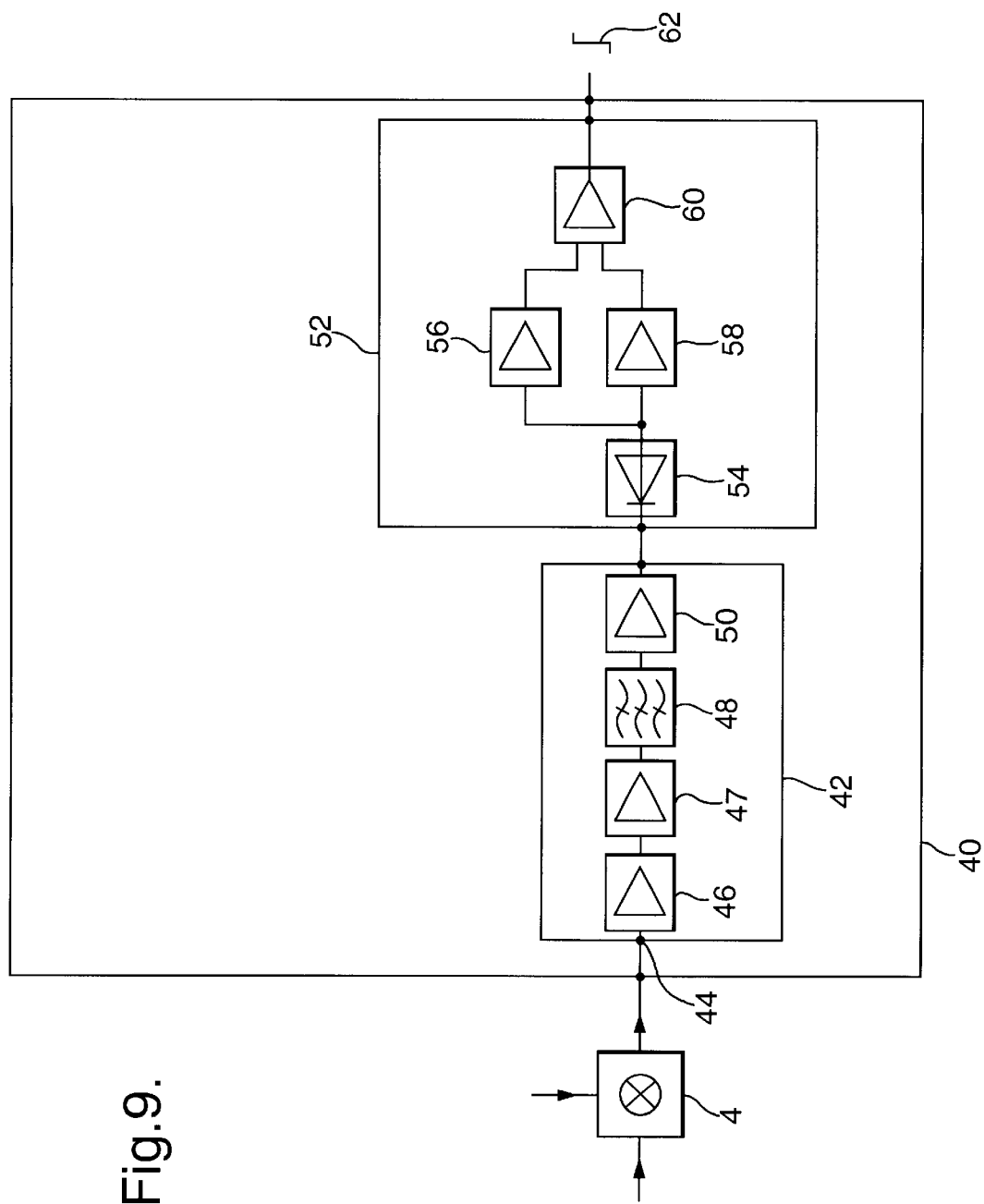
FIG. 9 shows a functional block diagram which represents the signal processing circuitry of the fuze.

FIG. 9 shows part of the electronics assembly 40 of the fuze. The intermediate frequency output from mixer 4 is fed into the intermediate frequency amplifier board 42 at input 44. The intermediate frequency is amplified by pre-amp 46, which is a low noise amplifier having a gain of approximately 28 dB and a noise figure of approximately 3 dB. This is followed by a non-inverting high pass amplifier 47 with a gain of approximately 27 dB. The high pass cut is around 28 kHZ, to provide rejection of any unwanted low frequency harmonics of the voltage controlled oscillator modulation.

The next stage is an active band pass filter 48 with 0 dB gain at a centre frequency of approximately 100 kHZ and a 3 dB bandwidth of approximately 10 kHZ. This is followed by a buffer amplifier stage 50 with a further gain of approximately 27 dB.

The overall gain of the intermediate frequency amplifier board 42 is approximately 82 dB which is sufficient to raise the background noise floor to enable small signal detection in detector board 52. The overall noise figure of the intermediate frquency amplifier chain is approximately 3.5 dB.

Detector board 52 comprises a signal detector diode 54, a peak detector 56, a threshold detector 58 and a trigger comparator 60. The amplified, filtered intermediate frequency signal is detected by diode 54, which produces a rising edge as the intermediate frequency appears in the band pass filter 48. When the rising edge of the diode's DC signal crosses a set threshold, the threshold detector 58 sends a signal to trigger comparator 60 which enables the output of peak detector 56 to be received by the trigger comparator. The rising edge of the DC signal from the diode 54 sends the peak detector output negative at the trigger comparator. As the fuze falls further the intermediate frequency signal will peak, corresponding to the required burst height, and would eventually fall. The top of the intermediate frequency signal is recognised by the peak detector 56 which performs a differentiation function, and its output swings positive. When of sufficient magnitude the positive swing will cross a pre-set threshold at the trigger comparator 60 which will result in a positive going edge at the trigger output, represented by trigger pulse 62. This is the pulse which triggers the detonator of the fuze.

This arrangement ensures that the trigger pulse is not produced unless the following conditions are met:

1. The detected signal is above a predetermined magnitude threshold.
2. The rate of change of the detected signal indicates that the detected signal has reached a peak.
3. The detected signal must peak during the time that the peak detector is enabled.

This reduces the possibility of false alarms, such as a peak in background noise at a frequency close to the required intermediate frequency.

Figure 10:
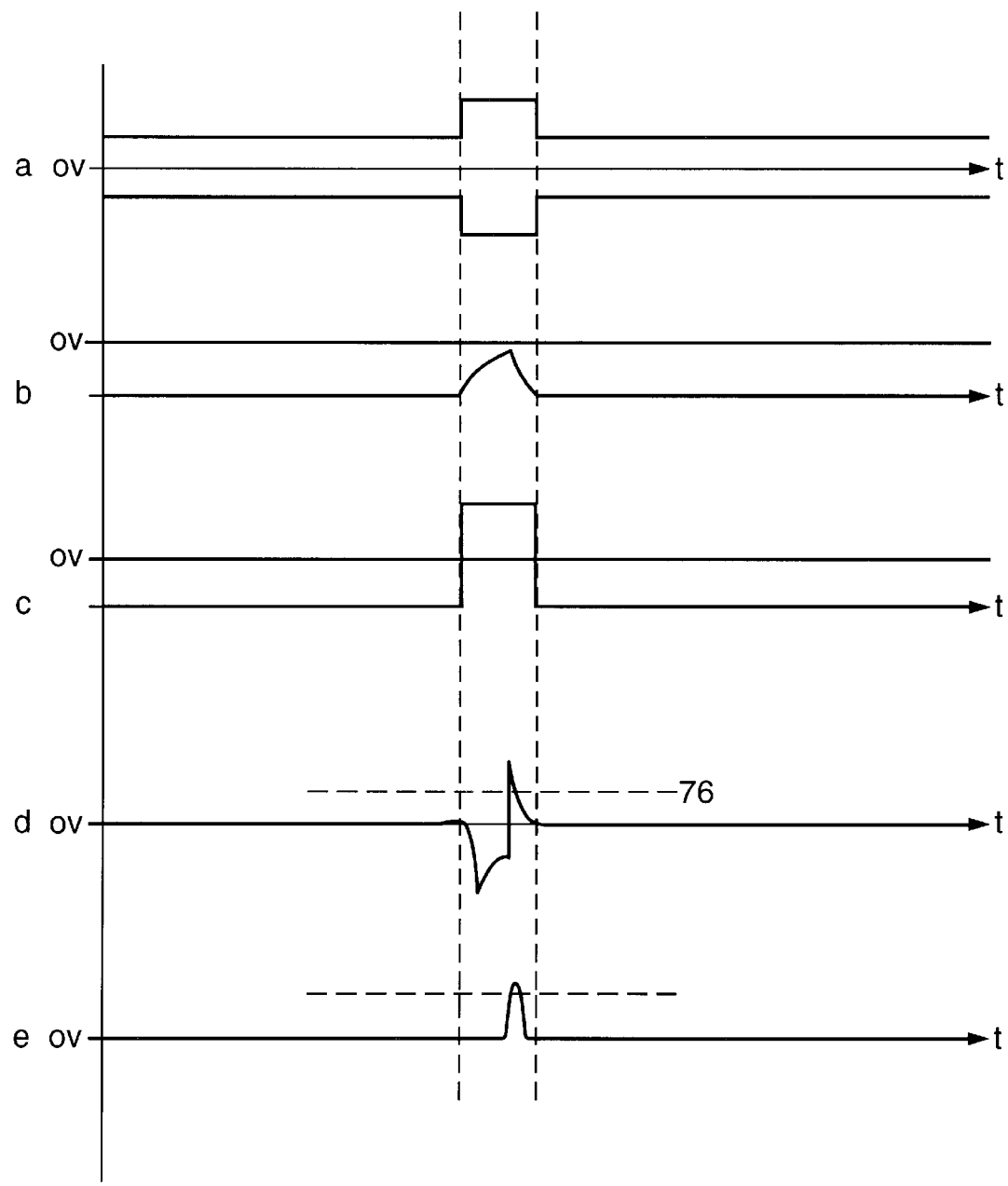
FIG. 10 shows voltage against time graphs for various points on the signal processing circuitry.

FIG. 10a shows the pulse modulated, band limited, intermediate frequency input to the signal detector diode.

FIG. 10b shows the output of the signal detector diode. This output is fed into both the peak detector and the threshold detector. The output has a slight negative voltage to allow the trigger comparator to produce a clear positive or negative signal output.

FIG. 10c shows the output of the threshold detector. The output is high when the signal is above the predetermined magnitude threshold.

FIG. 10d shows the output of the peak detector. The peak detector is not enabled until the threshold detector's output is high. Once enabled, the peak detector's output is negative. As the signal detector's output peaks, the rate of change of the signal detector's output changes sign, and the output of the peak detector therefore also changes sign to a positive output. When the trigger comparator receives a signal from the peak detector of a sufficient positive voltage 76, the trigger comparator produces a trigger response.

FIG. 10e shows the trigger response signal output from the trigger comparator. It can be seen that when the threshold detector's output is high and the peak detector's output reaches a predetermined positive voltage 76, the trigger comparator produces a trigger response.

Figure 11:
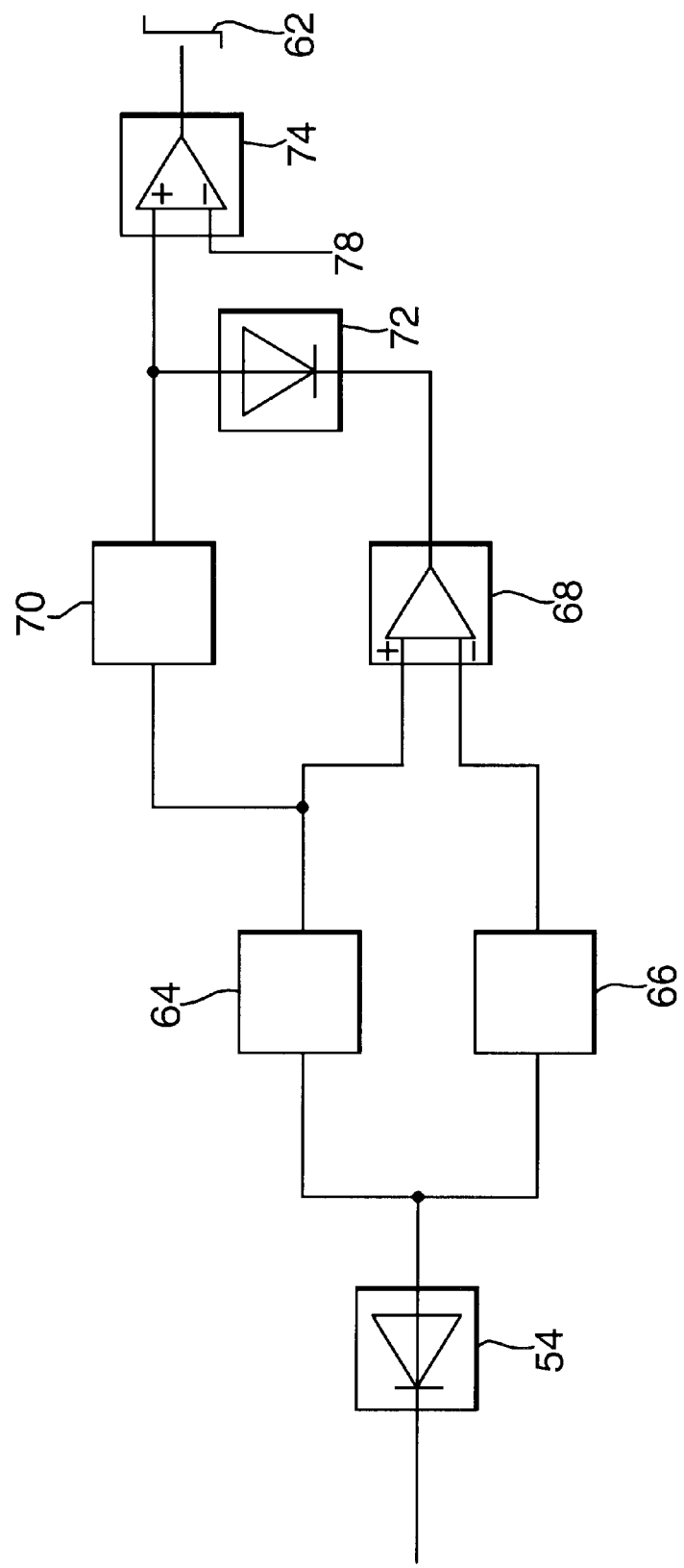
FIG. 11 shows a detailed block diagram which represents the signal detection and trigger gating part of the signal processing circuitry in one embodiment of the invention.

FIG. 11 shows the signal detector diode 54 of FIG. 9. This performs the same function as described previously. If the fuze is allowed to fall from above the burst height to the ground, there will be just background noise in the amplified signal received by the forward biased signal detector diode 54, as the bandpass filter 48 will filter out the intermediate frequency until it reaches approximately 105 kHZ. In this embodiment, the output of the diode 54 is video (wide band) filtered by two low pass filters of differing time constants. One is a fast filter 64 having a time constant of approximately 0.5 ms, and the other is a slow filter 66 having a time constant of approximately 22 ms. In the steady state the two filters produce the same DC output. The dual filter approach enables automatic detector thresholding to be employed.

The slow filter 66 output is attenuated and is presented to an inverting input of the threshold detector 68. The fast filter 64 is buffered and is presented to the non-inverting input of the threshold detector 68. The threshold detector 68 is biased by the differing inputs to hold its output negative. The negative output causes the diode 72 to clamp the non-inverting input of the trigger comparator 74 and the output of the peak detector 70. When the fuze falls through the required burst height, the intermediate frequency signal is passed by the filter 48 and is received by the diode 54. The diode 54 outputs a pulse. The pulse lasts as long as it takes the intermediate frequency to fall to a frequency which is not passed by the filter 48, which is approximately as long as it takes for the fuze to fall through about 10% of the range. For example, if the fuze is falling at a rate of 100 m/s and the burst height is set at 6 m then this will produce a pulse of approximately 6 ms.

The two video filters 64,66 respond to the detected pulse. The fast filter 64 closely follows the envelope of the pulse. The slow filter 66 lags far behind, so far behind that the fast filter output can exceed the offset bias pre-set in the steady state. This results in the threshold detector changing state and releasing the diode clamp 72 on the peak detector 70. This allows the peak detector 70 to output a signal to the non-inverting input of the trigger comparator 74. On the rising edge of the detected pulse the peak detector 70 produces a negative going signal. As the fuze falls through the burst height the peak of the pulse is detected by differentiation carried out by the peak detector 70 and the output of the peak detector 70 swings positive. If the positive swing is above the DC voltage at the non-inverting input of the trigger comparator 74 then a positive going edge (i.e. a trigger pulse 62) is produced at the trigger comparator 74 output. The inverting input of the trigger comparator 74 is biased, as represented by a bias voltage 78 on the drawings.

What is claimed is:

1. A proximity fuze for use in a tube launched projectile carrying a payload, comprising:

oscillator means for generating a radio frequency signal which has a varying frequency;

a single antenna means for transmitting the radio frequency signal and for receiving an echo of the radio frequency signal;

first signal processing means for generating a range signal corresponding to the time delay between the transmission of the radio frequency signal and the receipt of the echo signal;

second signal processing means for comparing the range signal with a reference signal and depending on the result of the comparison generating an activation signal for activating the payload;

wherein a directional coupling means is used for coupling the radio frequency signal from the oscillator means to the antenna means and to the signal processing means and for coupling the echo signal from the antenna means to the signal processing means;

and wherein the second signal processing means comprises a threshold detector, a peak detector and a comparator, the threshold detector allowing the comparator to utilise the output from the peak detector only once the range signal has reached a predetermined magnitude.

2. A fuze according to claim 1 wherein the signal processing means comprises mixing means for mixing a part of the transmitted signal with a part of the echo signal to generate a range signal comprising an intermediate frequency signal with a frequency corresponding to the difference between the frequency of the transmitted radio frequency signal and the received echo signal.

3. A fuze according to claim 1, wherein the radio frequency signal has a linearly varying frequency.

4. A fuze according to claim 1, wherein the oscillator means comprises a voltage controlled oscillator.

5. A fuze according to claim 4, wherein the fuze additionally comprises means for generating a linear triangular wave form voltage for driving the voltage controlled oscillator.

6. A fuze according to claim 1, wherein the directional coupling means comprises a quarter wavelength branch line coupler comprising four ports.

7. A fuze according to claim 6, wherein the oscillator means and the mixing means are located within an area bordered by the quarter wavelength transmission lines of the branch line coupler.

8. A fuze according to claim 1, wherein the fuze is adapted to allow operation in a pulsed mode, for transmitting a pulsed radio frequency signal.

9. A fuze according to claim 8, wherein the fuze comprises means for switching between a pulsed operating mode and a frequency varying operating mode.

10. A fuze according to claim 1, wherein the second signal processing means further includes two filters of differing time constants, the outputs of both filters being connected to the input of the threshold detector.

11. A tube launched projectile comprising a fuze according to claim 1.

* * * * *